United States Patent Office

2,914,416
Patented Nov. 24, 1959

2,914,416

STABILIZED ETHYL CELLULOSE COMPOSITIONS

Robert A. De Lap, Midland, Mich., assignor to The Dow Chemical Company, Midland, Mich., a corporation of Delaware No Drawing. Application October 30, 1958
Serial No. 770,593

15 Claims. (Cl. 106—177)

This invention relates to stabilized ethyl cellulose compositions that are particularly adapted to be shaped, molded and otherwise fabricated while they are in a thermoplastic condition at elevated working temperatures. The present application is a continuation-in-part of the copending application for United States Letters Patent having Serial Number 661,026, which was filed on May 23, 1957, and now abandoned.

Ethyl cellulose has been employed extensively and with significant advantage for the preparation of various shaped, molded and extruded articles, including films and the like. It is ordinarily conventional for molding and other fabricating compositions of ethyl cellulose to contain plasticizers and other desired ingredients. Ordinarily, the compositions are shaped at temperatures that may be as high as 500° F. In many instances during the fabrication of shaped articles from ethyl cellulose, it is not uncommon for the composition to be necessarily and unavoidably maintained at elevated temperatures for considerably prolonged periods of time. This, of course, may lead to degradation of the composition after it has experienced excessive thermal exposures, as may be evidenced by its discoloration and its loss in viscosity to an undesirable degree. Oftentimes, under such conditions, the point is reached where suitable shaped articles cannot be obtained with or from the composition.

It is conventional practice to stabilize ethyl cellulose compositions against thermal degradation by the incorporation therein of various antioxidant and other stabilizing additaments. For example, the type of degradation that is known as acid catalyzed hydrolytic degradation may be largely minimized or overcome by incorporating various acid-accepting epoxy compounds in the composition. Epoxy type compounds also tend to stabilize the viscosity of a heated ethyl cellulose plastic. Unfortunately, however, they may contribute to severe color formation in the composition.

Likewise, oxidative degradation may be compensated for and its effects substantially nullified by incorporating in the ethyl cellulose composition that is to be heated to a thermoplastic temperature for its fabrication any one or more of a great number of oxidation inhibitors that are known to be effective for the purpose. Among the most utile and beneficial of the antioxidant materials that are available for employment in ethyl cellulose compositions is 4,4'-thiobis(3-methyl-6-tertiary-butyl)phenol. This material can be obtained commercially as "Santowhite". Equally effective for this is 2,2'-thiobis(4-methyl-6-tertiary-butyl)phenol which is also a commercially available material.

The utilization of 4,4'-thiobis(3-methyl-6-tertiary-butyl)phenol or 2,2'-thiobis(4-methyl-6-tertiary-butyl)-phenol in a conventional manner as an antioxidant in ethyl cellulose molding and other fabricating compositions provides efficient means for greatly extending the useful life of the compositions, even when they are being maintained under the most rigorous and demanding influences of elevated fabricating temperatures. Unfortunately, however, despite its advantageous inhibiting efficacy and capability to restrain the composition from oxidation, 4,4'-thiobis(3-methyl-6-tertiary - butyl)phenol or its homologue is itself subject to the serious disadvantage and objectionable tendency of becoming highly discolored upon exposure for prolonged periods to heat at elevated temperatures. The antioxidant also tends to lower the viscosity stability of the ethyl cellulose composition. These deficiencies, of course, limit the general utility of the material for employment as an antioxidant in ethyl cellulose compositions that are intended to provide shaped articles having good color characteristics and desirable physical properties.

It would be a great advantage to provide stabilized ethyl cellulose compositions for thermoplastic extrusion, molding and other fabrication that could employ 4,4'-thiobis(3-methyl-6-tertiary-butyl)phenol and its homologues as antioxidant ingredients without being susceptible to becoming intolerably discolored upon prolonged exposure of the composition to heat at elevated working temperatures.

This desideration and other advantages and benefits may be realized in accordance with the practice of the present invention which provides ethyl cellulose compositions (which may be formulated with the usual plasticizing and other beneficial composition-modifying ingredients) and which contain, as stabilizing ingredients, minor proportions of each of (a) 4,4'thiobis(3-methyl-6-tertiary-butyl)phenol or one of its equivalent close homologues; (b) an acid accepting epoxy compound; and (c) a neutral (or substantially neutral) organic phosphite compound that is selected from the group consisting of alkyl phosphites, halogen substituted alkyl phosphites, aryl phosphites, halogen substituted aryl phosphites, mixed alkyl-aryl phosphites, mixed halogen substituted alkyl-aryl phosphites and mixtures thereof. Advantageously, between about 0.005 and 5 percent by weight of the 4,4'-thiobis(3-methyl-6-tertiary-butyl)phenol or equivalent homologue, a like amount of the acid accepting epoxy compound and between about 0.1 and 2 percent by weight of the neutral phosphite compound, each based on the weight of the composition, may be incorporated in the stabilized ethyl cellulose composition. More advantageously, amounts between 0.05 and 4 percent by weight each of the former antioxidant and acid accepting epoxy materials and between about 0.1 and 2 percent by weight of the latter neutral organic phosphite compound may be employed. In most instances, it may be found desirable to utilize proportions by weight of the antioxidant; epoxy compound; and phosphite that are in the weight ratio of 4:2:1, respectively (oftentimes in the neighborhood of a combined total of about 2.5 percent by weight of the composition) within the indicated ranges of each of the stabilizing ingredients.

It is usually suitable in the practice of the invention to employ an organic phosphite compound of the type that has been referred to in which the alkyl and aryl groups that may be involved independently contain from 2 to 10 and from 6 to 16 carbon atoms, respectively, in their structures. Equivalent structural characteristics are also applicable to the alkyl and aryl group in mixed alkyl-aryl phosphites. Tricresyl phosphite, 2-ethylhexyl octylphenyl phosphite, tri-(2-chloroethyl)phosphite, tri-isooctyl phosphite, tri-2-ethylhexyl phosphite, trihexyl phosphite, tri-1-naphthyl phosphite, triortho-xenyl phosphite, triphenyl phosphite, tri-(para-tertiarybutyldiphenyl)phosphite and tri-(paratertiarybutylxenyl)phosphite are typical of the organic phosphite compounds that may be utilized satisfactorily. Additional neutral phosphites that are suitable for employment may be similar to or identical with the other varieties of such compounds which have been illustrated in the disclosure of Canadian Patent No. 517,031.

Practically any of the acid accepting epoxy compounds may be utilized in the stabilized compositions of the present invention provided they are compatible in and with the particular system being stabilized. As will be appreciated by those who are skilled in the art, the determination of the compatibility of a particular substance which may be contemplated and intended as an ingredient for a hot melt composition may be simply and readily arrived at by easily performed tests. A wide variety of suitable acid-accepting epoxy compounds are known to the art and are readily available for utilization in the practice of the present invention. Included especially in this category may be such acid-accepting epoxy compounds as diglycidyl ethers of various polyglycols, particularly those polyglycols that are derived from condensation of say 8 to 40 moles of ethylene oxide or the like per mole of polyglycol product; diglycidyl ethers of glycerol and the like; metallic epoxy compounds; (such as those conventionally utilized in and with vinylchloride polymer compositions); epoxidized ether condensation products; diglycidyl ethers of bisphenol A (i.e., 4,4'-dihydroxy diphenyl dimethyl methane); epoxidized unsaturated fatty acid esters, particularly 4 to 12 carbon atom or so alkyl esters of 12 to 22 carbon atom fatty acids such as butyl epoxy stearate and the like; and various epoxidized long chain fatty acid triglycerides and the like, such as the epoxidized vegetable and other unsaturated natural oils (which are sometimes referred to as being epoxidized natural glycerides of unsaturated fatty acids, which fatty acids generally contain between 12 and 22 carbon atoms) that may be specifically typified and particularized by such compositions as epoxidized soya bean oil. Many of the acid-accepting epoxy compounds are available from various sources. In the following tabulation there are set forth several commercially available acid-accepting epoxy compounds that may be utilized suitably in the practice of the present invention. Each of the compounds listed is identified by its trade-designation, as well as by its general chemical characteristics where they may be known.

TABLE I

*Various acid-accepting epoxy compounds*

| Trade Designation | Chemical Characteristics |
|---|---|
| "Ferro 900" | Epoxy Resin Compound.ᵃ |
| "Stabilizer A-5" | Do.ᵃ |
| "Harshaw 7-V-2" | 100 percent active acid-accepting epoxy compound of unknown type. |
| "Paraplex"ᵇ | Epoxidized Soya Bean Oil. |
| "Drapex 3.2" | Octyl Epoxy Stearate. |
| "Admex 744" | Do. |
| "KP-90" | Butyl Epoxy Stearate. |

NOTE. ᵃ—Having the structure:

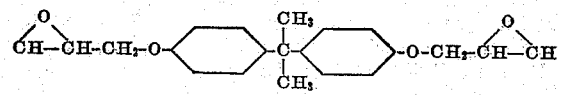

NOTE. ᵇ—Includes "Paraplex G-60," "Paraplex G-61" and "Paraplex G-62" grades of epoxidized soybean oil.

Compositions that are in accordance with the invention have excellent color stability and are usually capable of providing desirably clear and light colored articles, even after prolonged exposure to the most rigorous of temperature elevations. Their characteristics in this regard are pronouncedly and practically astoundingly superior to ethyl cellulose compositions that are identically formulated save for the organic phosphite compound additament or the acid-accepting epoxy ingredient, or both. In addition, the incorporation of the neutral organic phosphite compound in the composition exerts an ancillary viscosity stabilizing effect that augments the marked benefit that is obtainable in this regard with the combination of 4,4'-thiobis-(3-methyl-6-tertiary-butyl)-phenol or its homologue and an acid-accepting epoxy compound.

To afford further illustration, a stabilized ethyl cellulose composition was formulated to contain 2 percent by weight of "Harshaw 7-V-2" as the acid accepting epoxy constituent (whose specific composition is not generally known); one percent by weight of "Harshaw 8-V-5" as the neutral phosphite (an alkyl phosphite composition consisting of a mixture of about 25 weight percent of triisooctyl phosphite compound with about 75 weight percent of dibutyl phthalate plasticizer); and 0.5 percent by weight of "Santowhite" as the antioxidant. The formulated composition was shaped into chips which were maintained at a temperature of about 450° F. to evaluate their color characteristics. They were observed after 5 and 15 minute intervals of exposure at the elevated temperature. Their color characteristics at each point of observation was noted and indicated according to an arbitrary numerical scale from 0 to 25 in which lower ratings were indicative of better (that is, less) color. For comparison, an unstabilized ethyl cellulose composition was formed into chips and similarly tested. The results are set forth in the following tabulation.

TABLE II

*Comparison of unstabilized and stabilized compositions*

| Composition | Color Rating of Heated Chips at 450° F. | | |
|---|---|---|---|
| | Initial Chip | 5 min. Chip | 15 min. Chip |
| Unstabilized ethyl cellulose | 4.4 | 6.7 | 9.3 |
| Stabilized ethyl cellulose | 2.9 | 4.4 | 6.3 |

In addition, the retained viscosity of the stabilized composition was found to be commensurate with that of the unstabilized composition.

To afford still further illustration, a series of ethyl cellulose hot melt compositions were formulated and tested to determine their color stability and extent of degradation after exposure to heat at 250° C. They were also tested for initial viscosity, impact strength, tensile strength and elongation and weather stability. The compositions are set forth in the following Table III, in which composition "H" is formulated in accordance with the invention.

The results of the physical tests are represented in Table IV. The following properties were determined for each formulation:

(1) Initial viscosity—viscosity of a five percent concentration of the ethyl cellulose composition in a solvent system consisting of 60 weight percent toluene mixed with 40 weight percent of 2B alcohol (i.e., a mixture of 95 weight percent ethanol and 5 weight percent benzene).

(2) Heat stability—the plastic formulations were heated for fifteen minutes in the molding press at 250° C. A viscosity measurement was made on a chip which had been molded from this material.

(3) Izod impact strength—determined on notched impact bars using a Baldwin Impact Tester. Results are recorded in foot pounds per inch of notch.

(4) Tensile strength and percent elongation—determined on molded tensile bars using an Instron Tensile Machine at a separation rate of 0.2 inch per minute. Tensile strengths are recorded in pounds per square inch.

(5) Weather stability—tensile strength and per cent elongation data was obtained on tensile bars which had been exposed in an Atlas Weatherometer for a period of 300 hours.

(6) Color rating—molded chips were obtained from plastic formulations which had been (a) molded on regular cycle, (b) allowed to stand for five minutes in the tunnel of the molding machine at 250° C., (c) allowed to stand for fifteen minutes in the molding machine tunnel. The chip molded on regular cycle is only very slightly yellow, becoming yellow to brown over the fifteen minute heating period. The percent transmittances of these chips were measured through a ⅛ inch thickness of the composition using a Beckman Model B spectrophotometer. Color ratings were obtained from a graph relating plastic color to percent transmittance measured at a 450 millimicron setting on the Beckman machine. Low color values signify good color (very light, if any, yellow), high values poor color (yellow to brown).

TABLE III

*Hot melt compositions*

| Ingredient | Parts by Weight in Composition |||||||| 
|---|---|---|---|---|---|---|---|---|
| | "A" | "B" | "C" | "D" | "E" | "F" | "G" | "H" |
| Ethyl cellulose c | 84 | 84 | 84 | 84 | 84 | 84 | 84 | 84 |
| "P-1099" plasticizer d | 16 | 16 | 16 | 16 | 16 | 16 | 16 | 16 |
| "Paraplex G-62" e | | | | 2.0 | | 2.0 | 2.0 | 2.0 |
| Harshaw "8-V-5" f | | | 1.0 | | 1.0 | | 1.0 | 1.0 |
| "Santowhite" g | | 0.5 | | | 0.5 | 0.5 | | 0.5 |

NOTES:
c "Standard" grade having an ethoxyl content in the range from 48.0–49.5 percent by weight and containing an average of 2.46–2.58 etherified ethyl substituents per glucose unit with a viscosity of about 50 centipoises as determined by conventional test in a solvent mixture consisting of toluene and ethanol in a 4:1 volume ratio, respectively, obtained under the trademark "Ethocel, 50 cps., std."
d Bis-[para-(1,1',3,3'-tetra-methyl-butyl) phenyl] ether.
e An ester-type epoxidized soya bean oil plasticizer.
f A mixture of about 25 weight percent of triisooctyl phosphite with about 75 weight percent of dibutyl phthalate plasticizer.
g 4,4'-thiobis (3-methyl-6-tertiary-butyl) phenol

TABLE IV

*Physical properties of various ethyl cellulose compositions*

| Composition | (1) Initial Viscosity, cps. | (2) Viscosity Heated Chip, cps. | (3) Izod Impact Strength, ft. lbs. | (4) Tensile Strength, lbs. sq. in. || (4) Percent Elongation || Color Rating |||
|---|---|---|---|---|---|---|---|---|---|---|
| | | | | Initial | Weathered | Initial | Weathered | Initial | 5 Minute | 15 Minute |
| "A" | 57 | 33 | 1.8 | 5,127 | 2,685 | 24.7 | 1.4 | 6.5 | 12.6 | 22.2 |
| "B" | 69 | 36 | 1.6 | 5,333 | 3,962 | 18.0 | 1.4 | 6.1 | 10.8 | 20.0 |
| "C" | 61 | 6.7 | 2.4 | 5,403 | 2,540 | 25.8 | 1.4 | 2.9 | 7.2 | 29.4 |
| "D" | 67 | 77 | 2.4 | 4,683 | 3,312 | 21.3 | 2.0 | 5.3 | 11.3 | 22.2 |
| "E" | 69 | 5.3 | 1.6 | 4,683 | 2,948 | 26.3 | 1.5 | 2.9 | 7.5 | 31.0 |
| "F" | 68 | 87 | 2.2 | 4,667 | 4,482 | 20.1 | 3.1 | 5.5 | 12.2 | 26.2 |
| "G" | 64 | 44 | 2.8 | 4,193 | 3,043 | 23.8 | 2.0 | 3.7 | 5.7 | 7.5 |
| "H" | 71 | 45 | 2.5 | 4,367 | 4,446 | 20.3 | 15.2 | 3.4 | 5.0 | 6.4 |

Practically the same results as above are noted when 2-ethylhexyl octylphenyl phosphite or tris-(2-chloroethyl) phosphite are utilized in the same manner as the organic phosphite compounds and when a diglycidyl ether of a polyglycol from ethylene oxide or butyl epoxy stearate or hexyl epoxy stearate are employed as the acid-accepting epoxy ingredients. Commensurate outstandingly excellent results and literally dramatic benefits are provided when other stabilized compositions in accordance with the invention are formulated with other of the indicated species of organic phosphite compounds and acid-accepting epoxy compounds.

Although the present invention has been primarily illustrated with 4,4'-thiobis-(3-methyl-6-tert.-butyl phenol), it is to be clearly understood that the invention is equally susceptible to being successfully practiced with the equivalent homologues of the indicated oxidation-inhibiting compound. Thus, about the same excellent results are obtained using 2,2'-thiobis-(4-methyl-6-tert.-butyl phenol) as the antioxidant in the composition.

What is claimed is:

1. Ethyl cellulose composition that is stabilized with (a) between about 0.005 and 5 weight percent, based on composition weight, of an antioxidant selected from the group consisting of 4,4'-thiobis(3-methyl-6-tertiary-butyl)phenol, 2,2' - thiobis(4 - methyl - 6 - tertiary-butyl)phenol and their mixtures; (b) between about 0.005 and 5 weight percent, based on composition weight, of an acid accepting epoxy compound, and (c) between about 0.1 and 2 weight percent, based on composition weight, of a neutral organic phosphite compound that is selected from the group consisting of alkyl phosphites, halogen substituted alkyl phosphites, aryl phosphites, halogen substituted aryl phosphites, mixed alkyl-aryl phosphites, mixed halogen substituted alkyl-aryl phosphites and mixtures thereof.

2. The composition of claim 1 containing between about 0.05 and 4 percent by weight of the 4,4'-thiobis(4-methyl-6-tertiary-butyl)phenol (a); between about 0.05 and 4 percent by weight of the acid accepting epoxy compound (b); and between about 0.1 and 0.5 percent by weight of the neutral organic phosphite compound (c); each based on the weight of the composition.

3. A composition that is in accordance with the composition set forth in claim 2, wherein the proportions by weight of each of said stabilizing ingredients are in the ratio of about 4:2:1, respectively.

4. The composition of claim 1, wherein the neutral organic phosphite compound is an alkyl phosphite in which the alkyl groups independently contain from 2 to 10 carbon atoms in their structures.

5. The composition of claim 1, wherein the neutral organic phosphite compound is an aryl phosphite in which the aryl groups independently contain from 6 to 16 carbon atoms in their structure.

6. The composition of claim 1, wherein the neutral organic phosphite compound is an alkyl-aryl phosphite in which each alkyl group and each aryl group independently contains from 2 to 10 and from 6 to 16 carbon atoms, respectively, in its structure.

7. The composition of claim 1, wherein the neutral organic phosphite compound is tricresyl phosphite.

8. The composition of claim 1, wherein the neutral organic phosphite compound is 2-ethylhexyl octylphenyl phosphite.

9. The composition of claim 1, wherein the neutral organic phosphite compound is tris-(2-chloroethyl)phosphite.

10. The composition of claim 1, wherein the neutral organic phosphite compound is triisooctyl phosphite.

11. The composition of claim 1, wherein the neutral organic phosphite compound is tris-2-ethylhexyl phosphite.

12. The composition of claim 1 wherein the acid-accepting epoxy compound is a diglycidyl ether of a polyglycol.

13. The composition of claim 1 wherein the acid-accepting epoxy compound is an epoxidized vegetable oil.

14. The composition of claim 1, wherein the acid-accepting epoxy compound is epoxidized soya bean oil.

15. The composition of claim 1, wherein said antioxidant is 4,4'-thiobis(3-methyl-6-tertiary-butyl)phenol.

References Cited in the file of this patent

UNITED STATES PATENTS

| | | |
|---|---|---|
| 2,299,096 | Krieger | Oct. 20, 1942 |
| 2,400,333 | Bent | May 14, 1946 |
| 2,581,919 | Albert | Jan. 8, 1952 |
| 2,670,302 | Malm et al. | Feb. 23, 1954 |
| 2,675,327 | Gearhart | Apr. 13, 1954 |
| 2,713,546 | Williams | July 19, 1955 |
| 2,719,089 | Lovell | Sept. 27, 1955 |
| 2,739,123 | Kennerly et al. | Mar. 20, 1956 |
| 2,828,320 | Gibson | Mar. 25, 1958 |